(12) United States Patent
Fossard

(10) Patent No.: X7329
(45) Date of Patent: Dec. 14, 1832

(54) DYING, WITH ALKALINE PRUSSIATES

(76) Inventor: Fleix Fossard

Felix Fossard.

The schedule referred to in these Letters Patent and making part of the same containing a description in the words of the said Felix Fossard himself, of his Improvement in the process for manufacturing and dying with the alkaline prussiates.

---

Descriptive account of an improved method or methods of manufacturing the prussiates of Potash and of soda, and of a new or improved method or methods of employing the said prussiates or other prussiates of potash and of soda, with other substances or things (which will be described) and composing and fixing the elements of the prussiate of iron as a substitute for indigo in dy-ing wools in the flock, fleece, skeins, piece or otherwise, also in dying silks, cottons, linens and other textile or organic substances fit for the purpose of receiving color of a blue, blue black, black, bronze, marron, or any other colors, for which indigo has hith-erto been employed as a ground-work, principal or auxiliary. ——

---

Principal articles on which my claims are founded.

1st. For methods and processes for manufacturing the Prussiates of Potash and of soda.

2. On the method of passing wool into an acid bath before fixing the oxid of iron.

3. On obtaining or fixing the oxid of iron on all textile substances by means of the decomposition of the proto salts of iron, either by caustic alkalies, carbonates, or the earthy alkaline caustics. ——

4. On fixing the deutoxide of iron on all textile substances by immersing them in a bath formed of the proto salt of iron, for example, in the neutral state.

5. On the means of producing, upon textile substances, an uniform oxygenation of the protoxide of iron, or an oxid more oxygenated, by means of a current of heated air blown upon them. ——

6. On the use of an alkaline and saponaceous bath after the dying operation, before uniting the oxide of iron with the prussic acid of an alkaline prussiate.

7. On the passing of the textile substances (more or less dyed by the prussiate of iron) into a bath of a soluble prussiate, after dying them. ——

8. On the passing of the textile substances, when more or less dyed by the prussiate of iron, either in a bath of a proto-salt of iron or a persalt of iron, either the one or the other, or at once into one compound of these salts.

9. On the means of giving to textile substances dyed with the prussiate of iron a reddish blue color peculiar to this salt when combined with a substance affording a red dye.

10. On the means of fixing the prussiate of iron or copper upon the textile substances, by way of double decomposition by means of a bath composed of a soluble prussiate and another composed of the proto-salt of iron or a salt of copper.

11. On the means of producing green dyes on textile substances by the prussiate of iron and a vegetable or mineral substance giving a yellow dye.

12. On the use of [illegible] acid in the bath which gives a peculiar red to the blue, and to those which afford a yellow dye, and more particularly to the vegetable coloring materials in order to obtain green or black dyes by the prussiate of iron or copper.

13. On the means of producing blacks &c, on textile substances, and on fixing on them the oxides of iron and copper, before passing them into the vegetable coloring or other baths, and without putting metallic salts in these baths.

14. On the employment of baths for increasing or diminishing the intensity of color.

15. On the means of preventing the change of color on the dyed fabrics when exposed to the action of steam or air.

16th. On the general employment of the constituents forming the prussiate of iron instead of the solid compound so termed, as I do not actually employ the prussiate of iron known in commerce, but manufacture its principal constituent parts, and bring them into union upon the surface of the cloth, or other textile substances intended to be dyed.

17. On the principles, the character the effects and consequent results of the preceding articles applied to the works of a dye house.

---

Many of the things described in the various processes are not, strictly speaking my invention, but I claim only the practical and special application to which I adapt them.

them, in the process of manufacturing the prussiates of Potash and of soda, and of dying by these and other substances by the methods indicated.

Processes

Manufacture of the Prussiate of Potash.

Into an open, or closed cylinder of cast iron, to which a proper agitator has been fitted, put a mixture of equal parts of animal substances (1) and potash, (the less charged with sulphate the better) having previously mixed with the potash about one part of scraps of cast or forged iron or smiths scales, or one half of colcothar (peroxide of iron) or 2 parts of red ochre containing little lime, to 50 parts of potash.

Heat the cylinder to a low red heat and with the agitator, stir continually the substances submitted to calcination, increasing the motion gradually during about one hour, then stir more quickly, and when you find less resistance in the interior of the cylinder: and that the movement is more easy (to this great attention must be paid) you must then stir very quickly for about 8 or 10 minutes, for the substances are, in general, brought to the desired state of calcination, which is ascertained when but little smoke is apparent. Then immediately proceed to discharge the cylinder and to cool the calcined matter (2) When cooled, convey it to a vessel which must only contain water enough for the first moistening, and afterwards add the weak solutions of Prussiate (arising from the weak washings of the calcined substances) viz, about one quart to each pound of calcined matter. Stir from the bottom of the vessel, with a rake, during the time the calcined substance is thrown into the solution; continue this for some minutes at different intervals, after a few hours the calcined matter, thus moistened, must be put into a vessel charged to about one half of its height. Then admit water for the first process (and afterwards use the weak solution in the reservoir) to within about one foot of the brim. Fire must then be placed under the boiler, and the substances be kept boiling for about one hour and a half, and during this time the matter in the boiler must be continually stirred. After this filter it; taking care to stir briskly during the time the liquid is taken out, to have its deposit conveyed with it on the filter.

The calcined matter being sufficiently drained, take it off the filter, and put it into another boiler where it must be boiled, the first time with water, and in the [illegible]

subsequent processes with the weak solutions of the prussiate, for about an hour. then let it fall into another filter. The calcined substance being sufficiently drained is then to be carried to a vessel where it must be washed with hot water (to obtain the weak solutions, of which mention has been made for boiling the calcined substance. —— The Prussiate waters of the two boilings of the calcined matter being brought into one common solution, concentrate it in a boiler until it forms a pellicle or skin (3) on the surface of the boiling liquid. then put the solution into the crystallizer. — When the prussiate is crystallized and the solution cooled, convey the mother waters (that is to say the solution of Carbonate of Potash) into a reservoir upon which a filter has been placed, on which the crystals are to be thrown and drained, afterwards put all the solution into another boiler for the purpose of being concentrated, ...... When the calcined substances are sufficiently washed and drained in order to obtain the required weak waters, they must be completely dried in a stove, ...... Having concentrated the solution of potash until it precipitates a sufficient quantity of its carbonates – the dryed calcined matter kept as hot as possible, is to be carried to a vessel placed close to the boiler, which vessel is to be about one third filled. Add to it by portions, and that continuously, the solution of boiling concentrated potash; mix the calcined matter with the potash as equally and quickly as possible. The liquid must be added until the calcined matter becomes sufficiently wetted. This mixture is submitted to calcination in the same manner as a mixture formed with fresh animal matters and potash, nevertheless a small quantity of good animal substance may be added (if desired) for the first operation, but not to exceed one fiftieth part in the weight of the mixture, and one tenth part for the second operation generally speaking, which is the last one.

As regards the potash from the mother waters, it will serve for an indefinite number of operations. until the whole is converted into Prussiate, but previously to that the mother waters will have passed almost entirely into the states of subcarbonate and bicarbonate of Potash. To clear them of these salts they may from time to time be crystallized and the crystals be employed for such purposes as may be desired, or as the crystals may be decarbonated by calcination. For the second crystallization saturate boiling — water.

water with the prussiate of potash of the first crystallization in a boiler, and afterwards discharge it into a crystallizer, in which small lead weights are suspended by pieces of Pack thread attached to sticks placed across the vessel for the purpose of obtaining the mass of crystals, and to procure them clean and large — It will be necessary to prevent the liquid in crystallizing from cooling too suddenly. The crystallization being finished take out the crystals, let them drain, and they are fit for use. The mother waters are concentrated to obtain fresh crystals.

Notes.

1. Dried blood, horns, hoofs of animals, hair, old woollen cloths, bones, and in fact all other animal substances are more or less proper for the purpose, however corrupt may be their state.

2. It is advisable that the calcined matter be thrown into water until after it has become cool.

3. The formation of a pellicle is not always to be considered as a sure sign of perfect concentration, and of a fit State for crystallization.
The carbonated salts vary in this respect considerably, therefore it is recommended, before putting the matter into the crystallizer, to take a little of the solution, to cool it quickly and to filter it; then to saturate the excess of potash, and add to it a little weak solution of the persalt of iron, and if the filtered liquid precipitates a blue substance, the solution has not yet attained the desired point; on the contrary, if it does not produce this precipitate, or in very small quantities, the work is complete.

Prussiate of Soda.

The manufacture of this salt may be carried on in the same vessels &c. as are used for the manufacture of the prussiate of Potash, and the process and proportions are the same. The soda possesses only one disadvantage, that is, it carbonates more quickly than potash.
The advantages which it offers are as follows.
1st. The very low price of artificial soda, when purified, compared with that that of potash. 2°. The soda does not produce the hydrosulphurets by calcination, as is the case, more or less, with all potashes, in consequence of which the muriate of iron, for example, made with scales of iron, may in order to have the oxide in a state of hydrate, be added to the water of the weak solution of soda (if desired) before the calcined product is thrown into it. 3°. The artificial soda is, as well as potash, the produce of our soil and of our industry.

---

Additional Products.

If a closed cylinder be chosen for the calcination, a tube can be adapted (to the part opposite the place of insertion of the agitator) for the purpose of conducting the gazeous products into the first vessel of an ordinary Woulfe's apparatus, whence they may pass into other vessels where they may be separately collected. If the first boiler is in like manner closed and furnished, a reservoir can be appended, having an inverted leaden bell and containing a mixture of one part of sulphuric acid to ten parts of water. The gazeous products having run through will pass into the first vessel of a Woulfe's apparatus, that is into the first of two vessels placed at a little distance from the boiler, the first one being filled to about half its height with a solution of the muriate of Lime, which we will suppose to be about 15 degrees of the areometer for salts, and the second left entirely open, with the same quantity of water acidulated with sulphuric acid, as above. The products obtained are: 1°. *Hydrogen gas*, This gas may be employed to light the establishment, or for any other purposes. 2°. *Sub-carbonate of ammonia*. This salt obtained in the Woulfe's apparatus is deposited in a reservoir, on taking the solution of the nearest vessel to the cylinder. That in the second must be put into the first, and that of the third into the second, taking care always, to put water into the third; thus the solutions will be successively deposited in the reservoir. After some hours repose, the colored ammoniacal solution may be drawn off, and when it is perceived that the empyreumatic Oil begins to flow, you you collect it. 3<sup></sup>d. Empyreumatic Oil. This oil may be employed with the calcined matter (produced by the first calcination) instead of mixing it with solid animal substances, as it answers quite as well as the best of those substances 4th. Sub carbonate of ammonia. This salt is treated by the means already known, and used for its ordinary purposes. 5th. Muriate of ammonia. This salt obtained in the two vessels of the Woulfe's apparatus requires only to be collected and sublimed to obtain the salt in its ordinary form.

General Observations

Great advantages will arise if the cisterns reservoirs &c. are made of metal; Cast iron in preference to all others, as those constructed with wood do not answer so well. The utmost rapidity is required in charging the cylinders, so that the materials remain as short a time as possible without being agitated; and also in discharging it, so that the calcined matter may be withdrawn from the cylinder as soon as it has arrived at the proper point: at that point the matter will be of a clammy nature somewhat like the mortar used by masons:— if notwithstanding this state of semi-fluidity, small or trifling appearances of smoke should proceed from it, this will not be an unfavorable circumstance. This semi-fluidity will never take place if a sufficient quantity of potash has not been employed: therefore care should be taken to apply rather an excess of alkali, because that part of it, which is not converted into prussiate, will not be lost:— experience will prove the best guide on this subject. The work of calcination once commenced should be continued night and day for the sake of economy, and conducted in the same manner, with this only difference, when the mixture is made of animal substances which have already been employed: the operation is more prompt, and it will not be necessary to add any, or at all events but a small quantity of the ferruginous substances. Pumps and channels should be employed to transport the liquids from one vessel to another because they can be transported infinitely more quickly and without the waste occasioned by transporting them by hand.

The reservoirs should be about 7 feet high.

Drying Presses.

Baths.

No. 1. Acid Bath. This is composed of one part of the sulphuric acid of
ordinary strength (1) and about 50 parts of water, and is to be employed at a tempera-
-ture of from 77 to 100 degrees Fh or thereabouts. 2. Alkaline Bath. One part
of carbonate of soda and 100 parts of water. 77 to 100 degrees Fh. 3. Alkaline
Bath (2) Carbonate of soda of the specific gravity of three degrees by Beaumé's
areometer for salts - 77 to 100 degrees Fh. 4. Ferruginous Bath. All that
will be said of this bath in respect to its state of composition, excepting as
regards specific gravities, is to be understood as a applying also to the other baths
formed of the protoxide of iron, such as Nos. 5 and 10, in every instance where
the contrary is not mentioned. Proto salt of iron (3), as for instance the neutral
proto-muriate (4) at about 6 degrees of the areometer:— 144 to 167 degrees Fh.
5th Protoxided ferruginous bath. Proto salt of iron of little specific gravity,
which may be so small as to be nearly insensible to the areometer (5) about
144 to 167 degrees Fh. 6. Alkaline Bath. Alkali, for instance, one part of
carbonate of soda to about 100 parts of water — to be employed as no. 2.
7. Carbonated Saponaceous Bath. Soap, for example, neutralized (6) of the
specific gravity of about 1/10 of a degree of the areometer:— 212 degrees Fh.
8. Prussiate Bath. Prussiate of Potash (7) and sulphuric acid (8) in
such proportions as may be required to vary the degree of color which is re-
-quired to be given to the substances intended to be dyed:— 122 to 144 d. Fh
9. Prussiate Bath. To be used according to circumstances: the same prus-
-siate as in No 8, at about one degree of the areometer — 122 to 144 d. Fh
10. Protoxided ferruginous Bath. Proto-muriate of iron (3) at about 4
degrees of areometer for salts:— 190 to 212 d. Fh. 11. Peroxidated ferrugin-
-ous bath. Any of the per salts of iron at about 1/10 degree of the areometer. We
will suppose it made with the per-muriate of iron which has been oxygenated,
for example, with the Chloride of Lime (9) at about 122 to 144 degrees Fh. 12.
Acid Bath. Water slightly acidulated with muriatic or any other acid
which will be found equally good, except nitric acid, which tinges the
wool yellow — 144 to 167 d. Fh. 13. Cupreous Bath. Either muriate or
any other salt of copper at about three degrees of the areometer — 122 to 144 degrees or thereabout. 14. Ammoniacal bath. Liquid ammonia to be em-
ployed in proportions varying according to the color required to be given to the
cloth &c. — but in general in the following proportions — about one part of the
ammonia in volume to 200 parts of water. This bath is generally made and
used at the ordinary temperature, either to saturate the excess of acid in the
cloths &c. or to regulate and augment the intensity of the blue. 15. Aluminous
or Tin bath. Muriate of alumine, or Tin, at about 1/2 degree of the areometer
or a little less, in water charged with an earthy carbonate such as lime &c. —
this bath to be employed at about 132 to 144 degrees F. 16. Red Bath (10)
Madder by the ordinary method, but before employing the bath it should be
made slightly acid by means of Boracic or other suitable acid (11). 190 to 212.
17. Yellow Bath. Weld (12) or any other yellow coloring material — at about
190 to 212 degrees F. 18. This Bath may be prepared with any of the substan-
-ces containing gallic acids, and with logwood, Brazil wood, or any other
materials generally employed to dye black, bronze or Marron colors — 17 by to
190 degrees F. 19. Hot Stove Bath. A temperature of from about 132 to 144
degrees will generally produce the same action on metallic colorants as a
liquid bath; for example, when a current of warm air has been introduced
on the textile substances (13) either when they contain a protoxide of iron
which passes to a higher state of oxigenation, or when the said textile sub-
stances are impregnated with a proto-salt of iron which is decomposed
by the superoxigenation of its oxide, or in fact by oxigenation or de-oxi-
-genation, as it will be understood that the blue prussiate of iron is a perhy-
-dro cyanate in reference to the white prussiate of iron obtained by decompo-
-sing an alkaline prussiate by a proto-salt of iron, or that the blue color is
a cyanuret of iron, or either the one or the other. Therefore, whenever the
fabrics or other substances are in either of these three conditions; and when
they are exposed to a current of air peculiar to this operation, it will be
called the hot-stove bath. 20, Ammoniacal vapor bath. The exposure of
the cloth or other textile substances or matters dyed by the prussiate of iron
to an ammoniacal vapor bath gives to the prussiate of iron an intensity of
color, and fastness, depending on the quantity of the coloring matter itself.

at the ordinary temperature. 21. Acid vapor bath. The exposure of substances
or matters dyed by the prussiate of iron to an acid bath, either sulphuric,
muriatic, acetic, &c, causes the intensity of color produced by the ammonia-
-cal vapor by soap &c, to be lowered, or to become of less intensity - at an ordinary
temperature, or from that to any other approaching to 167 or 190 degrees if de-
-sired — The baths 1.2.5.6.7.9, and 10.12, cost but little, and may be
continued in use for about 15 days or even much longer. Bath No 3. will
be serviceable for about a month, if the wools are well freed from grease,
and washed, before being submitted to this bath; under all circumstances
it will be quite fit for use until it becomes soapy and dirty, in that case
those qualities would appear on the wools on being taken out of the bath
No5. in this state No3. must be considered as waste. The bath No 4 should
indicate about 5 or 6 degrees of the areometer for salts; having become
alkalined by decomposition of 4 or 5 degrees of Alkline salt, it indicates,
in the whole, 10 or 11 degrees and becomes unfit; in that state, it may be
employed, if desired, to form the bath No 10, or above all others, that of No 11.
Bath No 8 will serve for 8 or 10 operations for wool in the fleece and for 4 or
5 operations for cloths in the piece, or wool in the skeins, or other substances
this difference arises only from the circumstance of our being enabled to put
more of the prussiate of potash in the bath, when operating on the last
articles, as a less quantity of raw wool can be placed in the vessel, than
of the wrought material. The prussiate bath No 9 is never to be thrown
away, whatever may be its specific gravity, it will always serve to form
the bath No 8 on adding acid to it. If it be too strong of prussiate, add
water, If too weak add prussiate. Bath... 13 as no 4. Bath No 14 will
serve for 20 or 30 operations, and after that will be useful in forming
the bath No 8, instead of employing water and prussiate. As regards
the other baths, it may be generally said that they continue useful for
the same time as baths in ordinary use among dyers, nevertheless it
may be proper to state, that as they are not so likely to become agitated
or unsettled as common baths, their useful qualities may be calculated
on for a longer period.

The principe for dying the divers materials being the same, the operation differs only in the manner of handling them, which manner their various kinds will suggest. I will take, for example, wool in the fleece or flock. It is to be observed that only the woollen materials require the baths... 1 and 2. Put into the bath No 1, wool which has undergone the first operation of being freed from grease, allow it to remain about 10 minutes, stirring it for a short time. When it is taken out, if the liquor which drains from it be sensibly acid to the taste the operation is thus far accomplished. If on the contrary it be not, add a little acid to the bath and repeat the operation. When drained introduce it into the bath No 2, and treat it in the same manner and during the same time as in No 1. The liquid which drains from the wool on its being withdrawn from bath no 2, should have an alkaline taste. Whatever may be the nature of the wool submitted to these two baths or at least to the first one, it will absorb a much greater quantity of the oxide of iron than if it had been prepared by any other method, and after the oxide has been saturated by means of Prussic acid; the cloth will preserve its color during the operation of finishing, and in its general wear and usage.

The general method of fixing the oxide rests on two grand principles which we distinguish by the names of first and second methods. The first method is that of fixing the prot-oxide of iron on the wool by means of the decomposition of the proto-salt of iron by alkalies, or by their alkaline carbonates or by caustic earthy alkalis. The second method is founded on the general nature or quality of the oxide of the proto-salts of iron, a portion of which is constantly oxigenated when it comes in contact with the air, and when it abandons or throws off a part of its acid; and by this abandonment causing a much greater degree of oxigenation, and thus fixing on, and impregnating the wool with this salt, when this chemical change takes place. .............. First method of fixing the Oxide of Iron.

The wool having been prepared by the baths no 1 & 2, washed and drained, or even dried, are to be put in bath no 3 and stirred for a short time. When taken out, and drained one hour, place it in the bath No 4. The small quantity of wool which is not perfectly drained should be squeezed, or wrung wring, before it is put into that bath. Take care to spread the wool as equally as may be in the vessel in order that the mordant may be equally diffused to prevent an irregularity of color. One workman must continually agitate the surface of the bath with a stick in order to submerge the wool, and he should be careful not to push the wool to the bottom of the vessel until it has been well bathed in the liquid. Once or twice during this operation it may be well to discontinue putting wool into the bath, for a few seconds, during which time the wool already in the bath should be well turned round from top to bottom. This operation is more for the purpose of agitating the liquid than for any thing else, by which means the same quantity of the ferruginous matter continues to be applied upon the surface of the wool as at the commencement of the operation:— After having thus turned the wool over continue to add more of it, whilst ever you find it sinks into the vessel without pressure. After having remained in the bath for about ¾ of an hour, take it out, drain it, and a few minutes afterwards convey it to the warm stove bath No 19, in an ordinary stove; but a current of air heated and forced into it, is preferable to that of a natural circulation. The oxide being sufficiently oxygenated, the wool is to be removed to another bath, suppose to No 5, having remained and been stirred in this for about 5 minutes, it is taken out, drained and conveyed to bath No 6. where nearly the same course must be followed as with No 5. When it is desired to obtain a greater intensity of color from the oxide of iron, the wool must be repassed several times into the baths No 3. 4. 5 and 6. and probably a few more insertions into No 1 and No 19 may be requisite than into the others. Many things in fact, relating to this method depend on the color of the oxide which it is desired to obtain, for example, if you desire to have a color less intense, make an alkaline bath of less strength, or conduct the process of applying the mordant by the second method, or employ the baths generally less strong, or do not make use of the hot stove bath &c.

Second method.

The principal difference in this method from the first one, is that the bath No 3 is not employed, as for this is substituted the immersing the wool, more or less, in in the bath No 4 and also the use of baths rendered neutral by means of the earthy alkaline carbonates. These baths are called neutral earthy baths. The oxide of iron will become fixed on the textile substance by repeated immersion in the bath No 4 or any other bath containing the proto salt of iron and a neutral earthy carbonate. If necessary, saturation of the excess of acid (set at liberty by the oxide being fixed on the wool) may be resorted to, after every immersion (except after the first one, because the bath will remain in a neutral alkaline state, if the work has been conducted by the mode recommended for the first method) for example, until the bath forms a pellicle on its surface, which will be perceived in blowing on it. It will appear milky on adding chalk to it, but become perfectly clear on being stirred, if too great a quantity of the carbonate of lime has not been put into it.

The mordant being applied to the wool by either of these methods, and the wool drained, or dried which is preferable, pass it into the saponaceous bath No 7 in the following manner. Put about one third part of the wool which has been removed from bath No 4, scattering it about as much as you conveniently can, by handfuls at a time, stir it about continually whilst it remains in the bath, and after having remained there for 2 or 3 minutes take it out, drain and wash it in plenty of water.

Dying in Blue with the prussiate, or saturation of the oxide of iron by means of Prussic acid.

The bath No 8 should be prepared, in the following manner for (we will suppose) 400 pounds of wool mordanted for a royal or dark blue color (the cloth being nearly in a finished state) with 40 pounds of Prussiate of Potash or of soda and about 30 pounds of Sulphuric acid (if that acid is chosen) mixed together in about 700 gallons of water. Put all the wool quickly into it, then stir it at intervals of about ten minutes. The operation will be completed in about an hour and a quarter, if it should not be necessary to add either one or the other of the two articles with which the bath is formed; if such should be the case, the wool must be entirely withdrawn out of the bath, while such addition is made, and immediately afterwards be quickly lowered into it. An excess of the substances forming forming the bath may always be left acid, and, in general, it will be found more convenient, in case you are dying wool, as in this instance, in the fleece or flock, than may be found necessary when you are operating on cloths or stuffs but above all it will be found so if the mordant has been applied on the wool, which wool having been woven, you are unwilling to discolor, or obscure the lists, marks or figures, and when it is intended to pass the same into baths No 10 and 11. The wool being now in a colored State, the operation of dying may be continued by the manipulations and processes which follow, and which may be termed variations, by passing it successively into baths No 9 up to No 20 as may be requisite. The following are examples of some of these variations. 1st. The wool may be left in the State in which it was withdrawn from bath No 8. 2d. It may be dipped into bath No 9 for about 5 minutes, drained, and put into bath No 11 for a few minutes, then immersed we will suppose in bath No 12 two or three times in quick succession and withdrawn. 3d. After bath No 9, bath No 13 may be resorted to, instead of No 11. 4th. Instead of bath No 12 after No 10, No 11 may be previously employed. 5th. On the wool being withdrawn from the principal baths. 8, 10. 12 and 13, it may be carried to the warm Stove in order to oxigenate and augment the intensity of the prussiate of iron. 6th. After this the baths from 8 to 9, 10. 11, 12, 13, 14, No 15 can be resorted to for about ¼ of an hour, and the wool, when drained, be conveyed to No 16 for about 12 or 15 minutes. 7th. Bath No 15 can be omitted and the wool passed simply in No 16 as the one intended to produce a reddish hue upon the blue &c. After these various manipulations the wool is to be washed in plenty of water, then to be dried in order that it may be finished or brought into the required State to be woven into cloths &c.

Black, Bronze, &c colors,

These various colors may be obtained in the following manner. When you have affixed one or more of the metallic oxides on the textile substances, by the means already pointed out in reference to bath No 4 or 13, you may (by means of the decoction of the gallic substances, logwood, Brazil wood, or other vegetable colorants producing these dyes) form these different colors colors and shades, on passing the textile substances into them at about 150 to 180 degrees Fahr.t and afterwards applying the Prussiate of iron by the use of baths 9 and 10 more or less concentrated. For dying Cotton of a black, which will resist the action of the air, and the effects of washing, pro-ceed as follows. 1st. Suppose bath no 3 to be made with the caustic earthy alkalis, with lime for example, and at 77 to 100 degrees. Instead of bath No 4 employ No 13 which we will suppose to be made with the deuto-muri-ate of copper, and only indicating about half a degree of the areometer for salts, if the bath no 3 has been formed and employed as before named, taking care that it be limpid when the skeins are plunged into it. 2d. The skeins may be plunged into milk of lime, but in that case the bath No 4 or 13 must be more strongly charged with metallic salts. 3d. In fact, whatever may be the nature of the lime bath, several immersions must be made from 3 to 4 or 13 and vice versa, until the desired quantity of the oxide of copper is distributed over the fibrous substance. 4th. In the application of the salts of copper as a mordant, the bath No 2 properly called alkaline may be employed instead of the caustic earthy alkaline one, but above all when the bath is used at the ordinary temperature. 5th. A bath may be formed at once of the salts of copper and of iron. The mordant being fixed the cotton must be passed in the proper baths to produce a black dye (14).

---

The hair of different animals, and other substances which are used for making cloth or other fabrics, but which are generally felted, may with facility, be dyed of the different colors which have already been spoken of, in respect to other textile substances, after having been mor-danted as already described. In fact, all organic substances, such as straw, wood, &c. may be dyed by the processes and means before stated;

Notes referring to the baths, &c.

1st. Almost all the acids, except nitric acid, are fit for the formation of this bath.) 2d. Soda, Potash, or ammonia, either caustic or carbonated are fit for this bath, but the carbonates are preferable, and the carbonate of soda is recommended in preference to all others. The earthy caustic alkalis alkalis may also be used to form this bath and no 6. In composing these baths with earthy alkalis, a larger quantity of them must be introduced, than of Potash, Soda, or ammonia, because they do not contain the same degree of alkaline properties; and the vessels in which the baths are formed, must be deeper in order to contain an excess of deposit, and the baths must not be raised to quite so high a degree of heat.) 3d all the proto-salts of iron are more or less useful to form this bath which must be rendered neutral; — this may be done by adding the carbonate of lime, until the formation of a pellicle on the surface, which will be ascertained by blowing on it. 4th The ferru-ginous baths rendered neutral by caustic or carbonated alkalies, are called neutral alkaline baths, and those rendered so by caustic or carbonated earthy alkalis, are called earthy neutral baths.) 5th This bath may be formed with the water into which the cloths, wool, &c have been passed after being withdrawn from bath no 4, as it will be found that a sufficient quantity of the proto-salt of iron has been deposited, for the required purpose. 6th Neutralized by a well carbonized alkali, for example, soda the alka-line principle of which represents about one half of the same prin-ciple of which the soda is composed. Instead of soap, the alkali may be saturated by oil, grease &c. In fact all the alkalis saturated by a greasy matter will answer the purpose, particularly if a small portion of it remain in excess in the bath.) 7th all the Prussiates, alkaline as well as earthy, and above all that manufactured by the preceding process, will be found more or less useful for this bath and No 9. 8th all the acids which in coming into contact with the articles named in the preceding note, will cause the prussic acid to combine with the oxide of iron, and form the prussiate of iron, will be found more or less fit for the formation of this bath.) 8th bis, see note respecting bath No 4, 9th All sorts of chlorides will be found good for the purpose of oxigenating the per-salt of iron, and to keep it in the state already indicated. 10th all the coloring matters, either vegetable or animal, will be found useful for that bath.) 11th Boracic acid, without taking out the alumine of the mor-dant No 15, will produce a sensible change or alteration of Prussiate of iron iron in the baths 16 and 17. 12th Boracic acid may also be added to the
yellow vegetable coloring baths, in order to produce various shades of green
by the use of the prussiate of iron. 11th A Prussiate of copper may also be
obtained by double decomposition as a substitute of the prussiate of iron;
13th For several years past various cloth manufacturers have pursued a
new process in their works, which they have denominated "Decatissage"
or sponging; its intention is to prevent the cloth from being spotted by
rain &c. — this process is performed upon the cloth in different stages of
its manufacture, and also at the last and finishing one, when it is fitted
to be made into garments. This operation has sometimes the apparent
inconvenience of changing or modifying the clearness and beauty of the
color of the prussiate of iron upon cloths upon which it is applied;
but this change is effected without decomposing the blue, — its natural
beauty returns on exposing it to the air, and especially to a humid air,
to water, or to a liquid alkali, or to ammonia more or less dry. If the dye
upon the cloths &c. is perfect in color, this change will be produced in a
less degree. It should be remarked that the colors on very old garments
resist the action of steam more perfectly than those of cloths which —
have been recently finished, and upon which the air has acted for a
short time only. This valuable property of acquiring fixidity by the
action of the air is, for the dye by the prussiate of iron, a character entire-
-ly different from the radical defect of the dye by indigo, the color of which
is partially destroyed from the moment it is exposed to the action of the light
or air, and which also becomes white by friction.

Exd.
W.G.

Witnesses
Tho. P. Pickett
Jnt. Rodman

W. Hossard (7725 words)

Patented December 14 1832.

United States Patent
Patent No.: X7329
X 7329
Sheet 2-3 Sheets.
F. Fossard.
Making Prussiate of Potash.
Patented Apr. 23, 1834.
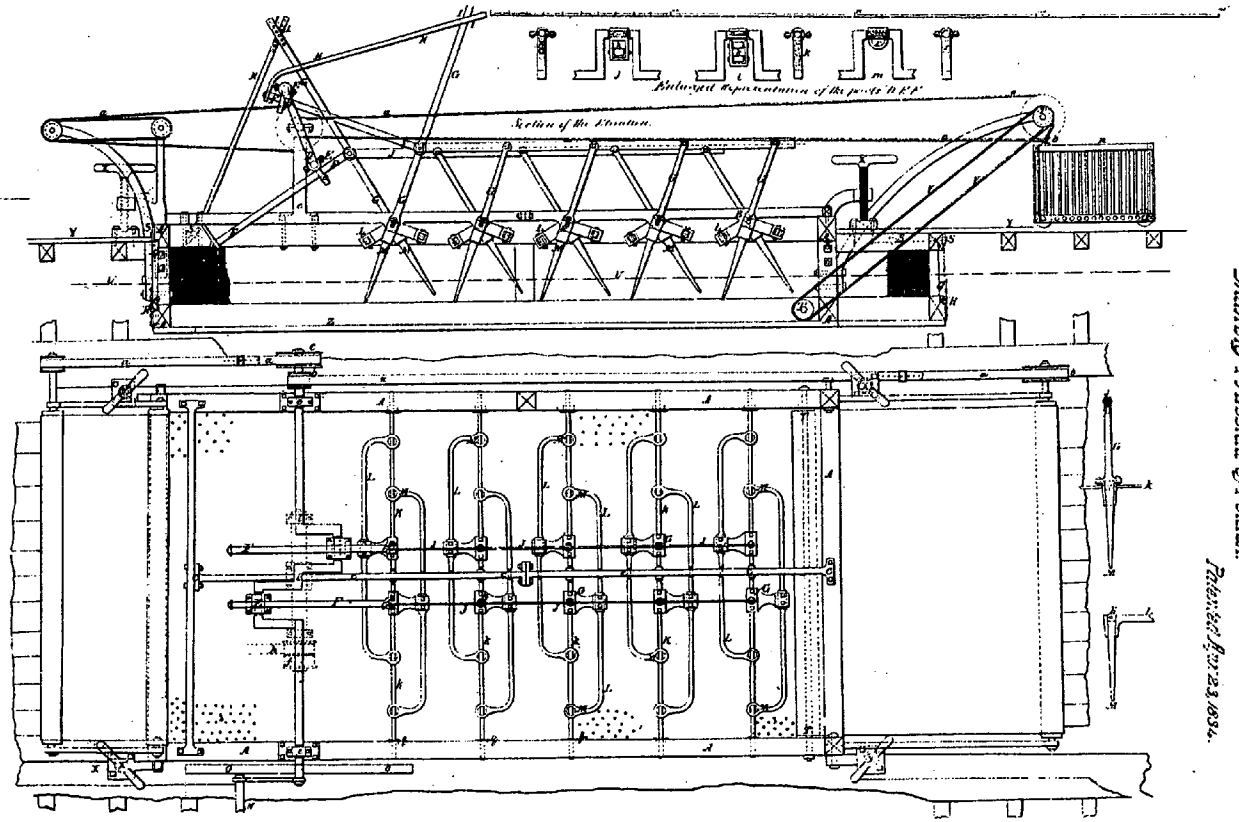
E. PETERS, PHOTO-LITHOGRAPHER, WASHINGTON D. C.